United States Patent [19]

Bühler

[11] 4,443,188

[45] Apr. 17, 1984

[54] LIQUID COOLING ARRANGEMENT FOR INDUSTRIAL FURNACES

[75] Inventor: Karl Bühler, Nussbaumen, Switzerland

[73] Assignee: BBC Brown, Boveri & Company, Ltd., Baden, Switzerland

[21] Appl. No.: 366,089

[22] Filed: Apr. 6, 1982

[30] Foreign Application Priority Data

May 20, 1981 [CH] Switzerland ............. 32808/81

[51] Int. Cl.³ .................. F27D 1/12; C21C 1/00; F28F 21/02
[52] U.S. Cl. .................. 432/233; 165/102; 165/176; 266/241; 432/238
[58] Field of Search ........... 432/233, 234, 237, 238; 122/68 B, 235 F; 165/176, 102; 266/241, 189, 190, 193

[56] References Cited

U.S. PATENT DOCUMENTS

| | | | |
|---|---|---|---|
| 1,810,165 | 6/1931 | Frank et al. | 165/145 |
| 3,471,134 | 10/1969 | Cone | 432/234 |
| 4,208,179 | 6/1980 | Gelsing et al. | 432/234 |

FOREIGN PATENT DOCUMENTS

2062835  5/1981  United Kingdom ............... 432/238

*Primary Examiner*—John J. Camby
*Attorney, Agent, or Firm*—Oblon, Fisher, Spivak, McClelland & Maier

[57] ABSTRACT

A liquid cooling system for thermally highly stressed parts of an industrial furnace consists of cooling channels, arranged essentially vertically and through which liquid flows and by-pass openings arranged at the upper end of the cooling channels for the direct passage of cooling liquid, by-passing the cooling channels. According to the dimensions of the by-pass openings, steam or gas bubbles are removed from the cooling system in a simple fashion and, at the same time, the cooling liquid which passes through the cooling channels and is heated is cooled by the cooling liquid flowing directly through the by-pass openings, before it again enters the next cooling channels. The by-pass opening(s) are formed by connecting tubes, or they are arranged in a cooling liquid distribution chamber, into which the cooling channels pass. With this liquid cooling arrangement, a practically unlimited number of cooling channels can be arranged in series, the cooling channels being formed in various fashions and being adaptable to the respective shape fo the furnace parts to be cooled, depending on the intended application.

14 Claims, 8 Drawing Figures

LIQUID COOLING ARRANGEMENT FOR INDUSTRIAL FURNACES

BACKGROUND OF THE INVENTION

1. Field of the Invention

The invention relates to a liquid cooling system for thermally highly stressed parts of industrial furnaces, with vertical cooling channels through which liquid flows.

2. Description of the Prior Art

Parts of industrial furnaces which are thermally highly stressed, eg. furnace walls, cover frames, door frames, gas removal nozzles etc. must be intensively cooled during operation in order to avoid deformation of these parts or even their destruction.

The parts to be cooled, particularly the walls of arc furnaces, have large surfaces. This means that the cooling liquid in the cooling systems must flow in such a way that as uniform as possible a cooling effect is achieved over the total furnace surfaces to be cooled. Perfect control of cooling in an industrial furnace by means of a liquid is of decisive importance for the operational safety of furnace operation, in order to protect the operating personnel from danger and to avoid material damage.

Such a liquid cooling arrangement is known from the publication "Wasserführende Zustellung für Elektrolichtbogen-Schmelzöfen (Water-cooled Lining for Electric Arc Melting Furnaces)", undated, of Mannesmann Demag, particularly the illustration on the title page.

While there are with this vertical cooling system design advantages compared to the traditional horizontal helical arrangement of the cooling channels, too little attention is paid in this design to the problem of local overheating and gas bubble removal from the cooling system.

Gas bubbles can be formed in a cooling liquid in two different ways, either as steam, eg. with water cooling, or by separation of previously absorbed gases from the cooling liquid at elevated temperatures. The gases thus formed will collect in the upper tube bends and the flow velocity of the cooling liquid will be inadequate to transport the gases vertically downwards in order to move them through the lower tube bends into the next vertical tube section in the direction of the cooling liquid discharge. In the usual situation, the cooling channels will, according to the quantity of the gas, fill partially or completely with gas; the cooling liquid can then only pass through part of the cross-section of the cooling channels and in extreme cases will pulsate intermittently. In places where this happens, the cooling effect is considerably reduced and the whole cooling circulation comes to a stop. A further problem associated with the phenomena described above concerns the sizing of the cooling medium pump. This pump must produce an increased pressure when gas is present in the cooling circulation, which pressure corresponds to the sum of the heights of the pressure medium columns which are missing because of the gas content. An increase of the pump pressure over and above that required for the normal circulation of the cooling liquid would lead necessarily to the use of larger pumps and thus to higher investment costs.

SUMMARY OF THE INVENTION

The subject of the present invention is to provide a remedy for the above problems. The invention, solves the problem of providing a cooling arrangement with essentially vertical cooling channels through which liquid flows, which serves to cool thermally highly stressed parts of industrial furnaces in an optimum fashion.

The advantages achieved by means of this invention are particularly apparent in that a practically unlimited number of essentially vertical cooling channels can be arranged in series as part of a cooling liquid circulation system and that the gases which develop at so-called "hot spots" in the cooling system are immediately removed. In this way, the cooling effect is increased and, through a decrease of the cooling circulations per furnace unit, the control instruments for the monitoring of the cooling liquid temperature and flow velocity are simultaneously decreased. This results in a lowering of investment costs. A further advantage is that the cooling liquid which has flowed through the cooling channels and has been heated is mixed in the upper part of the cooling channels with the cold cooling liquid flowing directly through the by-pass openings of the connecting tubes and is thus cooled before it flows into the following cooling channels of the cooling elements arranged in series. Gas bubbles which may be formed are either eliminated or led away without passing through even a single cooling channel.

According to one embodiment, the by-pass opening(s) are dimensioned in such a way that, taking the hydraulic resistance of the corresponding cooling channels into consideration, a quantity of cooling liquid, which can be determined in advance, flows through the by-pass opening(s), which is smaller than that which flows through the corresponding cooling channels. With this design feature, steam or gas bubbles which may be formed are immediately removed from the cooling system.

According to one embodiment, the quantity of cooling liquid which flows through the by-pass opening(s) is as large or larger than that which flows through the corresponding cooling channels. In this way, not only are gas bubbles which may be formed either eliminated or led away without passing through a single cooling channel, but the cooling liquid which passes through the cooling channels and is heated is cooled by the cooling liquid which flows directly through the by-pass opening(s) before it passes into the next cooling channel.

The flow quantity, flow velocity etc. of the cooling liquid which passes into the cooling channels can be controlled, and the cooling channels themselves can be dimensioned, in such a way that a part of the cooling liquid evaporates in the cooling channels and the steam is immediately removed from the cooling system through the associated by-pass openings of each associated cooling channel pair in the cooling liquid distribution chamber, without cooling liquid and steam interfering with each other in a way which is disadvantageous for the cooling effect. In contrast to the traditional liquid cooling described above, one obtains in this way a combined liquid and steam cooling, in which the heat required for evaporation is removed from the furnace parts to be cooled and thus applied usefully for cooling purposes.

The by-pass openings the, singly or in groups, passages which increase stepwise in the direction of flow of the cooling liquid. This design feature is essential particularly in combined water and steam cooling, since the steam can escape from the cooling system in a simple manner through the passages, in the by-passes, which increases in the direction of the liquid flow.

Numerous possibilities are available for the arrangement of the by-pass openings in the cooling liquid distribution chamber as well as the design features of the cooling channels.

The by-pass openings may be arranged between the upper edge of the baffles and the upper wall of the cooling liquid distribution chamber.

The cooling channels may be formed from a tube bent in a U-shape, the upper ends of which are short-circuited through a connecting tube.

The cooling channels may consist of a tube bent in a U-shape, the upper ends of which lead into the cooling liquid chamber.

The liquid cooling system may consist of a tube closed at the bottom, in which a partition is arranged centrally and extends in the longitudinal direction of the tube, which partition is at a distance from the lower tube edge and leaves a passage for the cooling liquid at the bottom of the tube.

The abovementioned tube may be closed at the bottom with a cover, preferably a domed cover.

The liquid cooling system may consist of an outer tube, which is closed at its lower end with a cover or a domed cover, in which an open inner tube is fixed, where the inner tube serves for the cooling liquid feed and the outer tube for the cooling liquid discharge.

The cooling liquid chamber may be inclined upwards with respect to the horizontal in the direction of flow of the cooling liquid; in this way, account is taken particularly of the buoyancy of the gases in the cooling system.

The partition which separates the cooling channels from each other, and the baffles in the cooling liquid distribution chamber, may be formed in one piece.

The liquid cooling arrangement may serve as the wall of an electric furnace, which is arranged above the bath level of the furnace.

A flue gas discharge nozzle of an electric furnace is liquid-cooled; the cooling channels may be integral with the wall of the nozzle.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
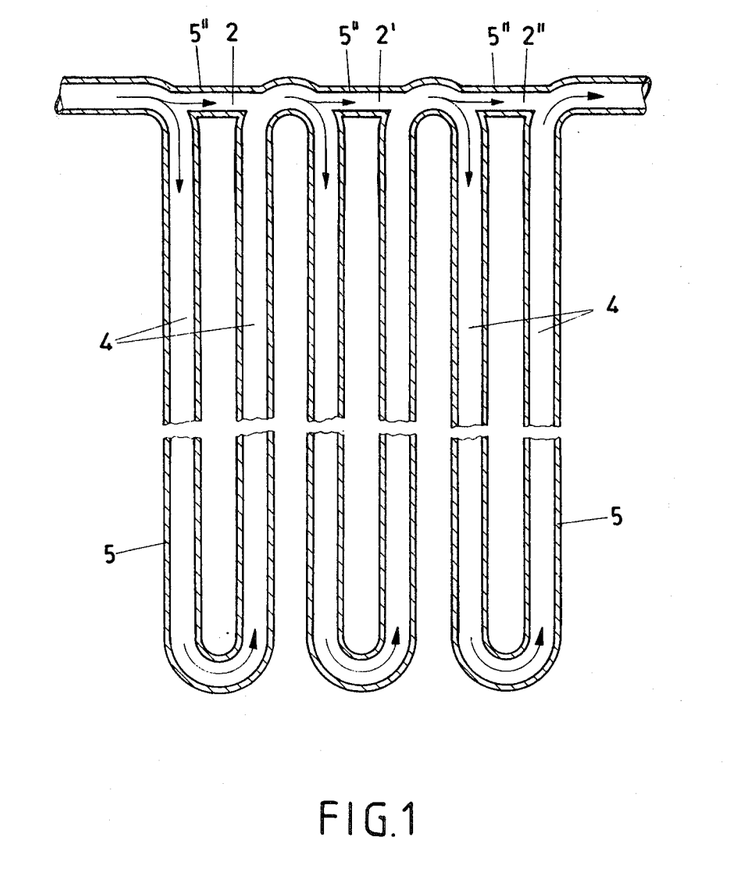
FIG. 1 shows a vertical section through a liquid cooling system.

An preferred embodiment of the liquid cooling arrangement according to the invention is shown according to FIG. 1. The drawing is shown in simplified form as a vertical section. The cooling channels 4 are formed by vertically arranged tubes 5, which are bent, at their upper and lower ends respectively, in a U-shape.

Connecting tubes 5'' are arranged in the upper part of the tubes 5 between the tube pairs 5 which are bent at the bottom in a U-shape; these connecting tubes provide by-pass openings 2, 2', 2'' in parallel with the cooling channels 4. The cooling liquid flows through a connecting nozzle—not shown—in accordance with the indicated arrows into the left upper cooling channel 4 and divides into two flow paths. One of these leads through the cooling channel 4 and the other through the by-pass opening 2 of the connecting tube 5''. Both partial flows then re-unite in the U-shaped section of the cooling channel 4 between the by-pass openings 2 and 2' and there mix with one another. In this way, the cooling liquid which has passed through the cooling channel 4 and has been heated is cooled by the cooling liquid which has passed directly through the by-pass opening 2 and is still cold. Steam and/or gas bubbles which possibly arise in the cooling liquid are either eliminated or led off without passing through even a single cooling channel. In FIG. 1, only 3 cooling channels 4 with corresponding by-pass openings 2, 2' and 2'' are represented. It is, of course, possible to arrange any desired number of cooling channels 4 in series within a cooling circuit.

Figure 2:
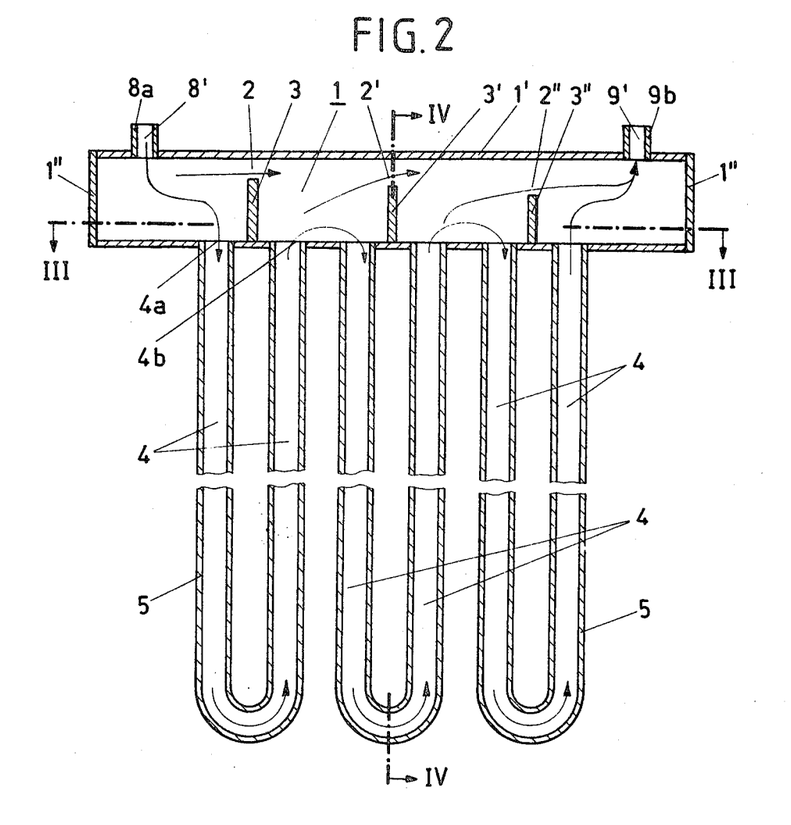
FIG. 2 shows a vertical section through a liquid cooling system with a cooling liquid distribution chamber.

In FIG. 2, a second embodiment of the liquid cooling system according to the invention is represented. The drawing is again shown in simplified form as a vertical section. The functional unit shown consists of a cooling liquid distribution chamber 1 and cooling channels 4, arranged vertically, through which the liquid flows; the cooling channels 4 are here formed from U-shaped tubes 5, the upper ends of which lead into the cooling liquid chamber. In FIG. 1, three tubes 5, bent in a U-shaped, each of which forms a pair of cooling channels, are attached to the cooling liquid distribution chamber 2. This cooling liquid distribution chamber 1 consists of four rectangular side walls 1' and two cover plates 1''. At the upper side plate 1' of the cooling liquid distribution chamber 1, there are two connecting nozzles 8a, 9b, whose openings 8', 9' serve respectively for the feeding and discharge of the cooling liquid.

The arrows drawn show the direction of flow of the cooling liquid.

According to FIG. 2, the cooling liquid enters into the left part of the cooling liquid distribution chamber 1 and divides into two flow paths. One part of the cooling liquid flows through the first by-pass opening 2, which is formed between the upper wall 1' of the cooling liquid distribution chamber 1 and the upper edge of a first baffle 3, where this baffle 3 is connected below and at the sides with the walls 1' of the cooling liquid distribution chamber 1. The other part of the cooling liquid, after entry, flows through the cooling channel entry opening 4a of the cooling channel 4, is heated thereby and leaves the cooling channel 4 through the cooling channel exit opening 4b. The exiting cooling liquid mixes, in the intermediate section of the cooling liquid distribution chamber 1 between the first baffle 3 and a second baffle 3′, with the cold cooling liquid which has passed through the by-pass opening 2 directly into the intermediate section of the cooling liquid distribution chamber 1, and is cooled.

The stepwise enlargement of the by-pass openings 2, 2′ and 2″ in the direction of flow of the cooling liquid is clearly visible in FIG. 2. In the embodiment shown only three cooling channels are illustrated. However, it is obvious that any number of cooling channels can be arranged in series. By means of the design feature of the arrangement of the by-pass openings 2 to 2″ in the cooling liquid distribution chamber 1, which enlarge in the direcition of flow of the cooling liquid, one makes use of the fact that the cooling liquid which is progressively heated in the cooling channels 4 is always cooled again in the cooling liquid distribution chamber, after leaving the respective cooling channel pairs, by the cold cooling liquid passing directly through the by-pass openings. In this way, any number of cooling channels 4 can be arranged in series without the cooling liquid, from its entry into the cooling system to its discharge from it, exceeding the boiling point.

Furthermore, with this cooling arrangement, combined water/steam cooling can be applied, where the steam that is formed can escape continuously and easily through the by-pass openings 2 to 2″ and can thus be readily removed from the cooling system. The collection of gas bubbles within the cooling system is thus avoided completely.

Figure 3:
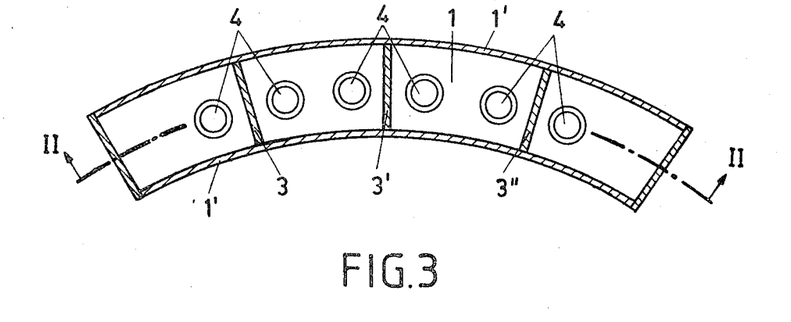
FIG. 3 shows a horizontal section through the cooling liquid distribution chamber according to FIG. 2.

FIG. 3 shows the second III—III from FIG. 2. The reference figures refer to the same parts as in FIG. 2.

In FIG. 3, the curvature of the cooling liquid distribution chamber 1 is particularly readily visible; this cooling liquid system could, for example, form a cooling segment for the furnace wall of an arc furnace.

Figure 4:
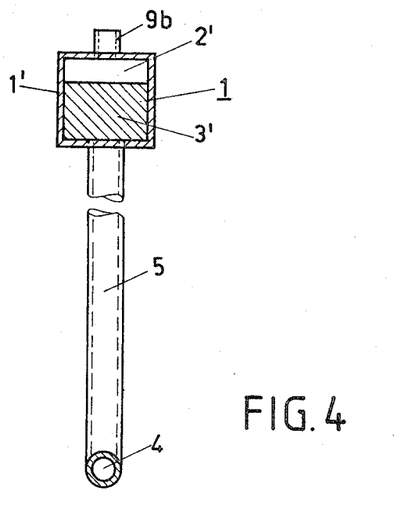
FIG. 4 shows a vertical section through the liquid distribution chamber and cooling channel according to FIG. 2.

FIG. 4 shows the section IV—IV from FIG. 2. In this drawing, one can see particularly well the arrangement of the by-pass opening 2′, which is formed between the upper edge of the baffle 3′ and the upper wall 1′ of the cooling liquid distribution body 1.

Figure 5:
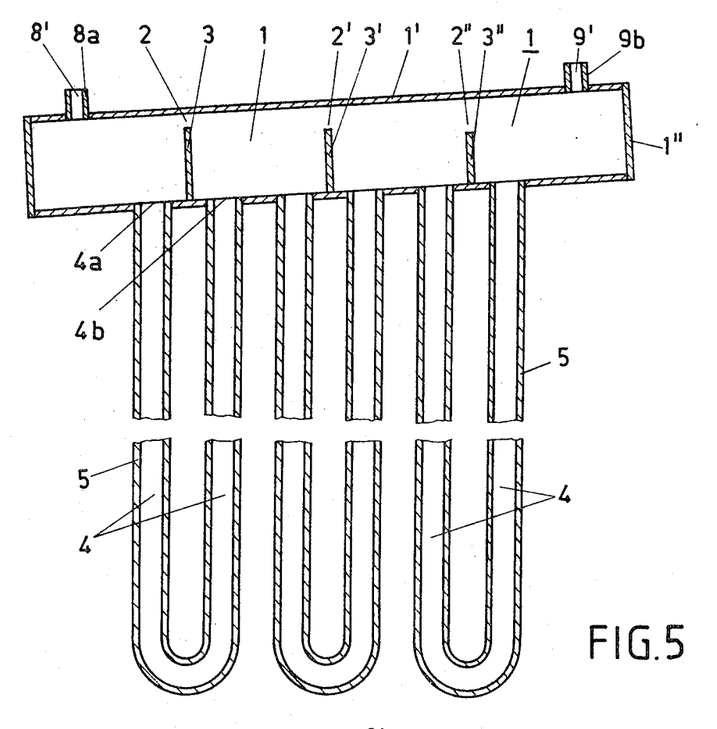
FIGS. 5 to 7 show vertical sections through further embodiments of the liquid cooling system.

FIG. 5 shows a variation of the embodiment of FIG. 2. This drawing also is shown in simplified representation as a vertical section. The reference figures refer to the same parts as in FIGS. 2, 3 and 4.

The construction of the liquid cooling system according to FIG. 5 corresponds to that of FIG. 2, with the exception that the cooling liquid distribution chamber 1 is inclined upwards with respect to the horizontal in the direction of flow of the cooling liquid. In this way, the escape effect of gas bubbles or steam from the cooling system is promoted by making use of the buoyancy of the gas bubbles or steam.

Figure 6:
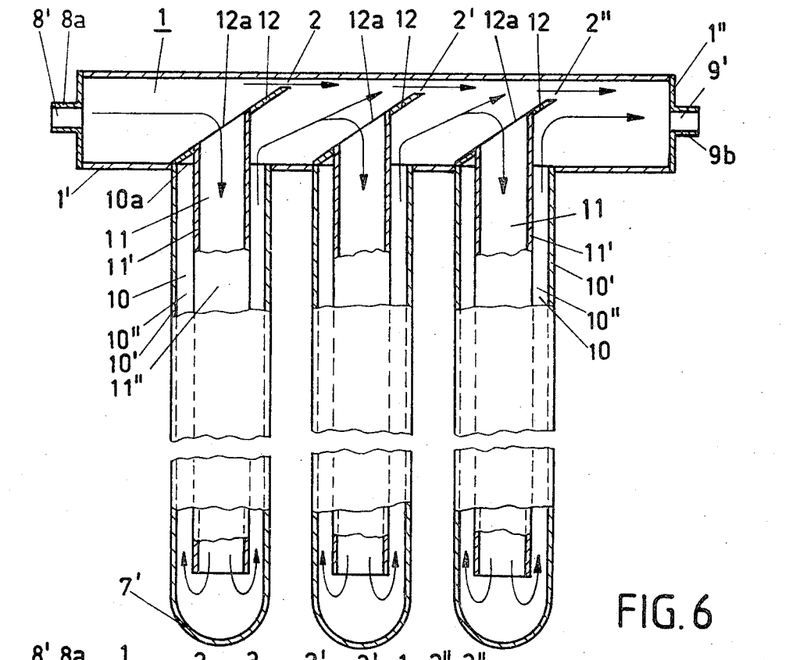

FIG. 6 represents a further embodiment of the invention. This drawing is again shown in simplified form as a vertical section. An inner tube 11, which is open at the bottom, is arranged in the longitudinal direction parallel within an outer tube 10, and both tubes 10, 11 lead, with their walls 10′, 11′, at a distance from each other, into the cooling liquid distribution chamber 1 in the upper part of the tubes 10, 11; here the wall of the outer tube 10′ is connected with the wall of the cooling liquid distribution chamber 1′ and the wall of the inner tube 11′ is conected with an oblique fixing sheet 12, which is arranged as a baffle. The outer tube 10 is closed from below with a cover, which, in the example shown, is arranged as domed cover 7′. In the drawing, three tube pairs are attached, each with an inner tube 11 and an outer tube 10, to the cooling liquid distribution chamber 1.

A feed nozzle 8a and a discharge nozzle 9b are arranged in the side cover plates of the cooling liquid distribution chamber 1″; the feed and discharge of the cooling liquid takes place through their openings 8′, 9′.

The arrows drawn indicate the direction of flow of the cooling liquid.

According to FIG. 6, the cooling liquid enters the left part of the cooling liquid distribution chamber 1 and divides into two flow paths. One part of the liquid quantity flows directly through the by-pass opening 2, while the remaining part flows through the passage 12a in the fixing sheet 12 into the feed channel 11″ formed by the inner tube 11, and past the open lower end of the inner tube 11 into the annular space 10″, which is formed by the walls 10′, 11′ of the inner tube 11 and the outer tube 10. In the annular space 10″, the cooling liquid flows upwards according to the direction of the arrows, and in this way cools the wall 10′ of the outer tube 10; it finally passes through the passage 10a again into the cooling liquid distribution chamber 1.

The heated cooling liquid which flows from the annular space 10″ back into the cooling liquid distribution chamber 1 mixes there with the cold cooling liquid coming directly through the by-pass opening 2, as described in FIG. 1 and FIG. 2, and the process of division of the cooling liquid into the two flow paths, namely through the by-pass opening 2′ and through the passage 12a of the inner tube 11 of the middle tube pair shown in the drawing, is repeated anew.

Figure 7:
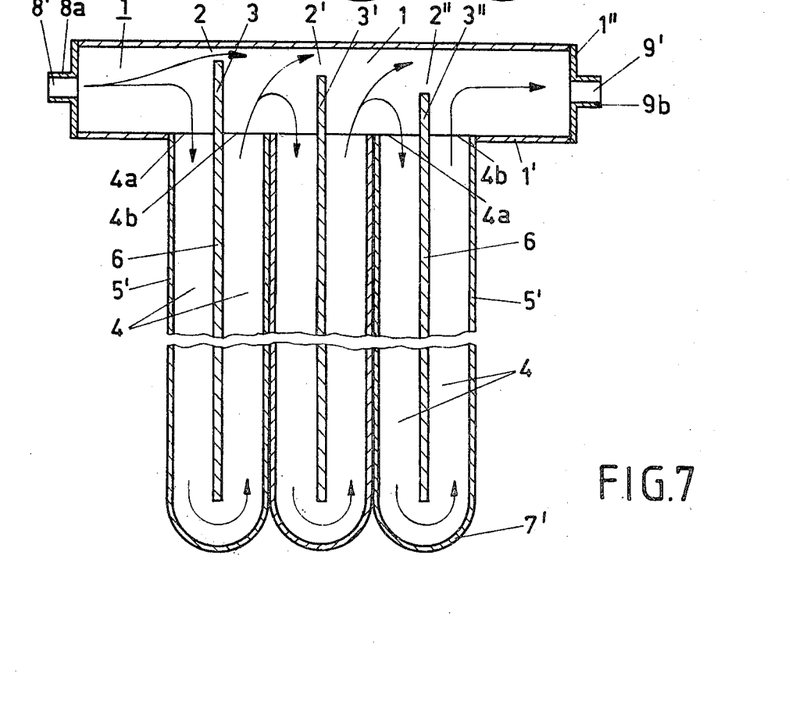

In FIG. 7, a further embodiment of the invention is represented. This drawing shows again a vertical section through the liquid cooling arrangement.

Three vertical tubes 5′, arranged closely next to each other, lead into the cooling liquid distribution chamber 1. The tubes 5′ are closed at the lower end, each with a cover or a domed cover 7′. The cooling channels 4 are formed by a partition 6, which is in the center of, and extends in the longitudinal direction of, the tube. This partition is at some distance from the lower tube end and leaves a passage for the cooling liquid at the bottom of tube 5′. The partition 6 continues at the top and forms the baffles 3, 3′, 3″ in the cooling liquid distribution chamber 1. Each partition 6 and baffle 3 are made as one piece.

A feed nozzle 8a and a discharge nozzle 9b are again arranged in the side cover plates of the cooling liquid distribution chamber 1″; the feed and removal of the cooling liquid takes place through their openings 8′, 9′.

the flow of the cooling liquid is again divided in accordance with the arrows shown, in a manner that one part flows through the by-pass openings 2, 2′, 2″ and correspondingly the remaining part passes through the cooling channel entry openings 4a into the cooling channel 4 and through the cooling channel discharge openings 4b again back into the cooling liquid distribution chamber 1.

The further flow takes place in the same manner as described in FIG. 2.

It is obvious that in the embodiments according to FIGS. 6 and 7 any number of cooling channels 4 can be arranged in series and that with these embodiments combined water and steam cooling can also be applied.

Figure 8:
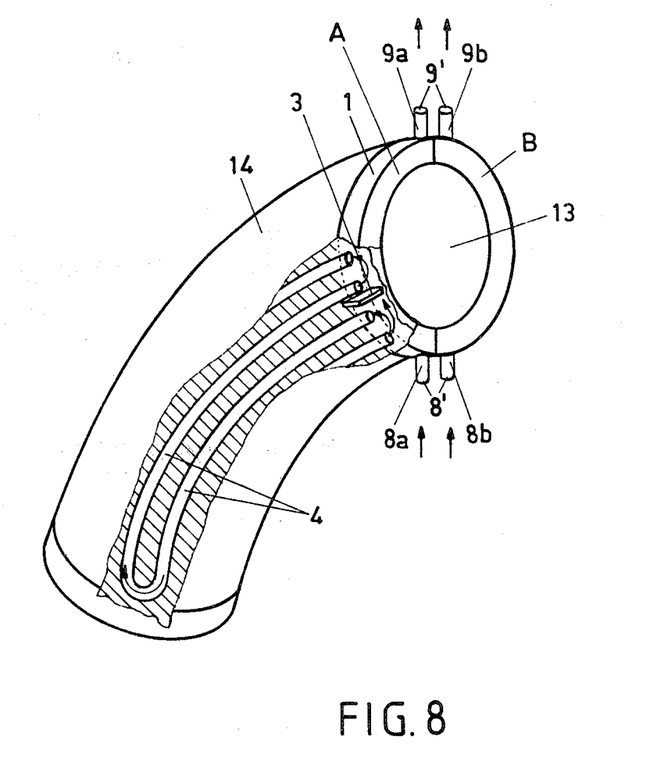
FIG. 8 shows a perspective representation of a flue gas discharge nozzle in partial section.

FIG. 8 shows a further development of the invention, in which the cooling system according to the invention is adapted to a flue gas nozzle for an arc furnace.

FIG. 8 is a perspective drawing in partial section. In FIG. 8, two independent symmetrically arranged cooling units A and B are shown, each of which corresponds in essentials to the embodiment according to FIG. 2, with the exception that the cooling channels are curved corresponding to the shape of the flue gas channel.

The cooling liquid chamber 1 of the first liquid cooling unit of the flue gas discharge nozzle A is provided with a feed nozzle 8a and a discharge nozzle 9a, and the cooling liquid chamber 1 corresponding to the second liquid cooling unit B is provided with the feed nozzle 8b and the discharge nozzle 9b. The cooling liquid is fed and discharged respectively through the openings of the feed nozzles 8′ and the discharge nozzles 9′.

The arrows drawn in the sectioned left unit A show the direction of flow of the cooling liquid. It can be seen that a baffle 3 is arranged between each tube pair, and that the tubes envelop the flue gas channel 13 cylindrically. The cooling channels are covered on the outside with an outer shell of the flue gas channel 14.

FIG. 8 is only shown schematically and the connecting flanges, which connect the flue gas draw-off nozzle with the arched cover of the furnace and with the flue gas draw-off line, are not shown.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an industrial furnace having thermally highly stressed parts including furnace walls, cover frames; door frames and gas removal nozzles, a liquid cooling system for said thermally highly stress parts, said system comprising:
   first flow means defining at least two pairs of first and second substantially vertical cooling channels having top and bottom ends;
   first conduit means connecting the bottom ends of said first and second channels for providing flow communication therebetween;
   second by-pass conduit means connecting the top ends of said first and second cooling channels of each said channel pair;
   inlet means providing cooling fluid flow to the top of said first channel of one said channel pair;
   third conduit means providing fluid flow between the tops of first and second channels of adjacent channel pairs; and
   outlet means providing fluid outflow from the top of said second channel of a channel pair,
   whereby cooling fluid from said inlet means and said third conduit means divides so as to flow into said first channel of one said channel pair, and to flow into said second conduit means thereby by-passing said channels, and whereby said fluid from said channels and said by-passed fluid mix in a succeeding said third conduit means and in said outlet means,
   wherein said system further comprises a cooling liquid distribution chamber into which the tops of said channels extend, said distribution chamber including a fluid inlet at a first end, a fluid outlet at a second end and baffles defining by-pass openings at the top thereof, each said baffle being positioned between the tops of said first and second channels of each said pair of channels, whereby the portions of said distribution chamber between said baffles comprise said third conduit means and said by-pass openings comprise said second by-pass conduit means,
   wherein said pairs of cooling channels each consist of a tube closed at the bottom, wherein a partition is arranged centrally and extends in the longitudinal direction of said tube, said partition terminating at a distance from the lower end of said tube, thereby defining said first and second channels and defining said first conduit means at a bottom of said tube.

2. Liquid cooling system as claimed in claim 1, wherein the bottom of said tube is closed with a domed cover.

3. Liquid cooling system as claimed in claim 1 or 2, wherein each said partition and baffle are formed in one piece.

4. In an industrial furnace having thermally highly stressed parts including furnace walls, cover frames; door frames and gas removal nozzles, a liquid cooling system for said thermally highly stress parts, said system comprising:
   first flow means defining at least two pairs of first and second substantially vertical cooling channels having top and bottom ends;
   first conduit means connecting the bottom ends of said first and second channels for providing flow communication therebetween;
   second by-pass conduit means connecting the top ends of said first and second cooling channels of each said channel pair;
   inlet means providing cooling fluid flow to the top of said first channel of one said channel pair;
   third conduit means providing fluid flow between the tops of first and second channels of adjacent channel pairs; and
   outlet means providing fluid outflow from the top of said second channel of a channel pair,
   whereby cooling fluid from said inlet means and said third conduit means divides so as to flow into said first channel of one said channel pair, and to flow into said second conduit means thereby by-passing said channels, and whereby said fluid from said channels and said by-passed fluid mix in a succeeding said third conduit means and in said outlet means,
   wherein said system further comprises a cooling liquid distribution chamber into which the tops of said channels extend, said distribution chamber including a fluid inlet at a first end, a fluid outlet at a second end and baffles defining by-pass openings at the top thereof, each said baffle being positioned between the tops of said first and second channels of each said pair of channels, whereby the portions of said distribution chamber between said baffles comprise said third conduit means and said by-pass openings comprise said second by-pass conduit means, and wherein said by-pass openings define, singly or in groups, stepwise larger passages in the direction of flow of said cooling liquid.

5. In an industrial furnace having thermally highly stressed parts including furnace walls, cover frames; door frames and gas removal nozzles, a liquid cooling system for said thermally highly stress parts, said system comprising:

first flow means defining at least two pairs of first and second substantially vertical cooling channels having top and bottom ends;

first conduit means connecting the bottom ends of said first and second channels for providing flow communication therebetween;

second by-pass conduit means connecting the top ends of said first and second cooling channels of each said channel pair;

inlet means providing cooling fluid flow to the top of said first channel of one said channel pair;

third conduit means providing fluid flow between the tops of first and second channels of adjacent channel pairs; and outlet means providing fluid outflow from the top of said second channel of a channel pair, whereby cooling fluid from said inlet means and said third conduit means divides so as to flow into said first channel of one said channel pair, and to flow into said second conduit means thereby by-passing said channels, and whereby said fluid from said channels and said by-passed fluid mix in a succeeding said third conduit means and in said outlet means, wherein said system further comprises a cooling liquid distribution chamber into which the tops of said channels extend, said distribution chamber including a fluid inlet at a first end, a fluid outlet at a second end and baffles defining by-pass openings at the top thereof, each said baffle being positioned between the tops of said first and second channels of each said pair of channels, whereby the portions of said distribution chamber between said baffles comprise said third conduit means and said by-pass openings comprise said second by-pass conduit means, wherein said by-pass openings are defined between upper edges of said baffles and an upper wall of said cooling liquid distribution chamber.

6. Liquid cooling system as claimed in claim 4 or 5 wherein said pairs of cooling channels are each formed from a tube bent in a U-shape, the upper ends of which lead into said coolng liquid distribution chamber.

7. Liquid cooling system as claimed in claims 4 or 5 wherein said cooling liquid distribution chamber is inclined upwards with respect to the horizontal in the direction of flow of the cooling liquid.

8. The system of claim 4 or 5 wherein each said pair of cooling channels comprise:

an outer tube having a top fixed to a bottom of said distribution chamber and a closed dome shaped bottom; and an inner tube having a top fixed to one of said baffles and an open bottom.

9. The system of claim 4 or 5 wherein said cooling channels are integral with the wall of the flue gas draw off nozzle of said furnace for cooling said nozzle.

10. In an industrial furnace having thermally highly stressed parts including furnace walls, cover frames; door frames and gas removal nozzles, a liquid cooling system for said thermally highly stress parts, said system comprising:

a tube bent in a U-shape and defining at least two pairs of first and second substantially vertical cooling channels having top and bottom ends;

said bent tube further defining first conduit means connecting the bottom ends of said first and second channels for providing flow communication therebetween;

a connecting tube defining a second by-pass conduit means connecting the top ends of said first and second cooling channels of each said channel pair and short circuiting said bent tube;

inlet means providing cooling fluid flow to the top of said first channel of one said channel pair;

third conduit means providing fluid flow between the tops of first and second channels of adjacent channel pairs; and outlet means providing fluid outflow from the top of said second channel of a channel pair, whereby cooling fluid from said inlet means and said third conduit means divides so as to flow into said first channel of one said channel pair, and to flow into said second conduit means thereby by-passing said channels, and whereby said fluid from said channels and said by-passed fluid mix in a succeeding said third conduit means and in said outlet means.

11. The system of claim 1, 4 or 5 or 10 wherein said by-pass conduit means are dimensioned, relative to said channels, such that the fluid flow through said by-pass conduit means is smaller than the fluid flow through said channels.

12. The system of claim 1, 4 or 5 or 10 wherein said by-pass conduit means are dimensioned, relative to said channels, such that the fluid flow through said by-pass conduit means is at least as large as the fluid flow through said channels.

13. The system of claim 1 or 4 or 5 or 10 wherein said cooling channels are positioned adjacent said thermally stressed parts for cooling said parts.

14. The system of claim 13 wherein said channels are positioned above a level of a material in said furnace.

* * * * *

UNITED STATES PATENT AND TRADEMARK OFFICE
CERTIFICATE OF CORRECTION

PATENT NO. : 4,443,188
DATED : April 17, 1984
INVENTOR(S) : Karl Buhler

It is certified that error appears in the above-identified patent and that said Letters Patent is hereby corrected as shown below:

--[30] May 20, 1981 [CH] Switzerland ........ 3280/81 --

Signed and Sealed this

Twenty-eighth Day of August 1984

[SEAL]

Attest:

GERALD J. MOSSINGHOFF

Attesting Officer     Commissioner of Patents and Trademarks